Feb. 17, 1959  C. J. WERNER  2,873,826
BRAKE COOLING CONTROL
Filed Dec. 29, 1955  2 Sheets-Sheet 1
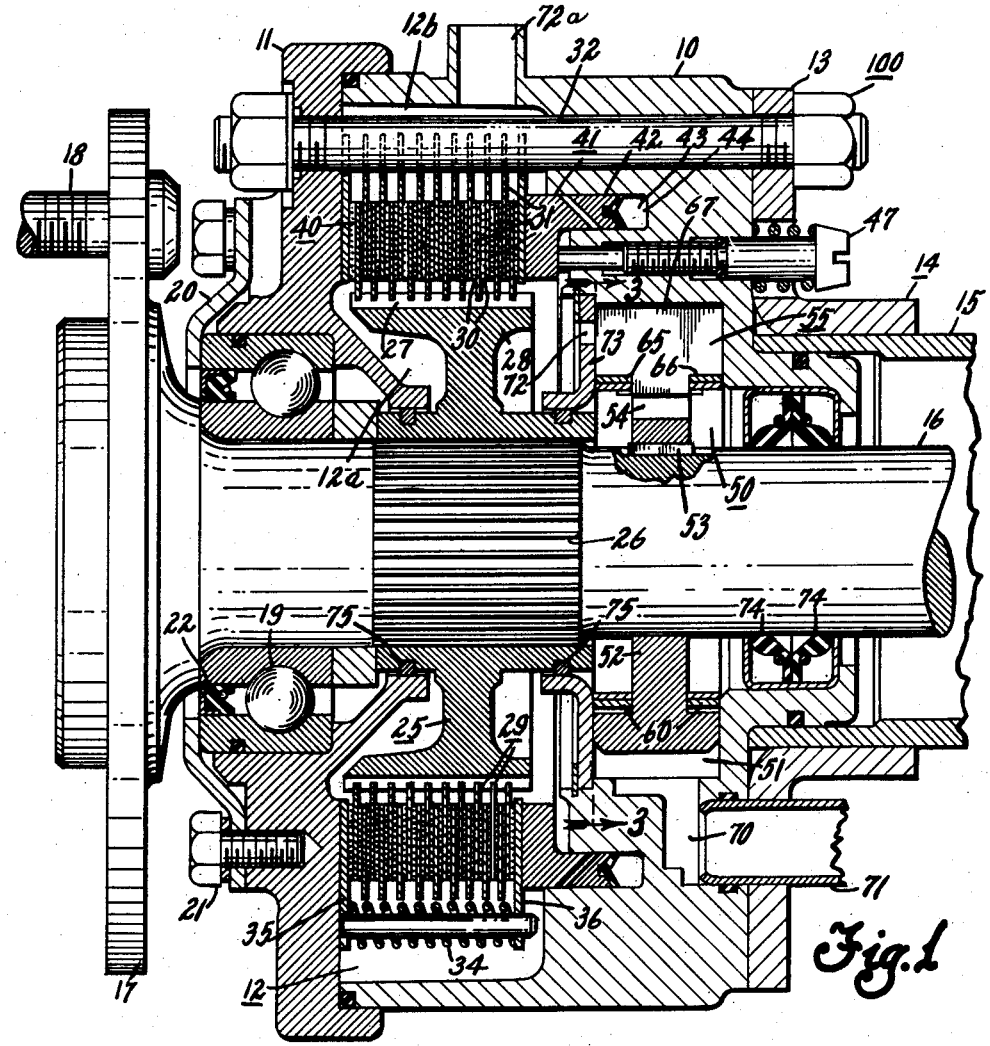
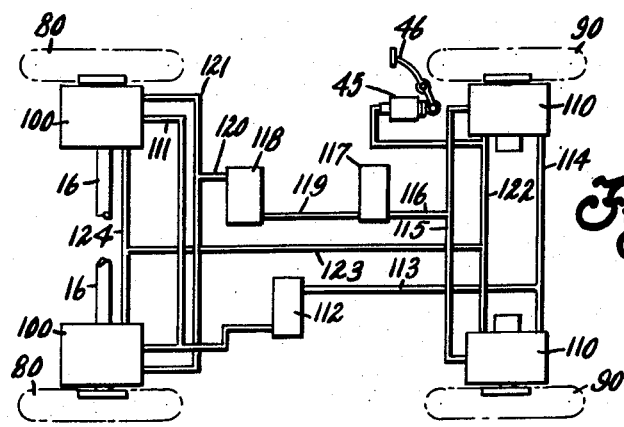
INVENTOR.
CALVIN J. WERNER
BY Craig V. Montoro
HIS ATTORNEY Feb. 17, 1959   C. J. WERNER   2,873,826
BRAKE COOLING CONTROL
Filed Dec. 29, 1955   2 Sheets-Sheet 2

INVENTOR.
CALVIN J. WERNER
BY
Craig V. Monton
HIS ATTORNEY

United States Patent Office 2,873,826
Patented Feb. 17, 1959

2,873,826

BRAKE COOLING CONTROL

Calvin J. Werner, Dayton, Ohio, assignor to General Motors Corporation, Detroit, Mich., a corporation of Delaware Application December 29, 1955, Serial No. 556,168

7 Claims. (Cl. 188—264)

This invention relates to a liquid cooled energy transfer mechanism such as a friction brake used on a motor vehicle.

More particularly, this invention relates to a multiple disk friction type brake for a motor vehicle wherein a liquid is forcefully circulated through the disk assemblage of the brake to remove the heat of friction created during operation of the brake. The liquid is delivered into the brake under pressure from a fluid pump to create the forced circulation of the fluid through the brake. The liquid after passing through the brake and absorbing the heat of friction is directed to a heat exchange device that is suitably cooled so as to reduce the temperature of the fluid that was heated in the brake. The cooled fluid is returned to the circulating pump so that the fluid can be continuously recirculated in the system including the brake and the heat exchange device.

So long as the temperature of the circulating fluid is below a predetermined temperature value, such as about 250–275° F., there is relatively little need for circulation of the entire body of fluid through the heat exchange system. Under this condition the pump can be rendered inactive for effecting forced circulation of fluid through the heat exchange system at least until the temperature of the cooling fluid rises above a predetermined minimum value. Such an arrangement removes the drag created by continuous circulation of fluid during periods when it might not be necessary, removing the horsepower requirement for driving the pump, and thereby increasing the overall efficiency of the motor vehicle.

It is desirable to have the pump that circulates the fluid operate continuously so that when a braking operation occurs the fluid discharge from the pump will be immediately available for delivery to the brake to remove the large quantity of heat of friction that is created during the braking operation.

Therefore it is an object of this invention to provide a liquid cooled energy transfer mechanism such as a multiple disk friction brake with a liquid circulating pump that operates continuously concurrently with operation of the wheels of the vehicle wherein the pump is rendered active or inactive for circulation of liquid through the brake and the heat exchange system connected therewith in response to the temperature environment of the pump that is reflected by the temperature of the liquid in the pump or circulating through the pump.

It is another object of the invention to provide a liquid cooled multiple disk friction brake in a liquid coolant circulating system wherein the liquid coolant is forcefully circulated by a pump operatively connected with a wheel of the motor vehicle for continuous operation of the pump, and wherein the pump includes a thermally actuated mechanism that responds to the environmental temperature of the pump to cause the pump to deliver full volume flow for circulation through the brake only when the environment temperature of the pump is above a predetermined value.

Another object of the invention is to provide apparatus in accordance with the foregoing object wherein the pump is provided with a plurality of pumping members that have one position that renders the pump ineffective for full flow forced circulation of liquid by the pump and a second position to effect full flow liquid delivery from the pump, the pumping members being actuated by a thermally active mechanism that responds to the environmental temperature of the pump to move the pumping members from the first position to the second position as the environmental temperature of the pump reaches or exceeds a predetermined temperature value.

Further objects and advantages of the present invention will be apparent from the following description, reference being had to the accompanying drawings wherein a preferred form of the invention is clearly shown.

In the drawings:

Figure 1 is a transverse cross sectional view of a brake incorporating features of this invention.

Figure 2 is a schematic view of a cooling system incorporating the brake of this invention.

Figure 3:
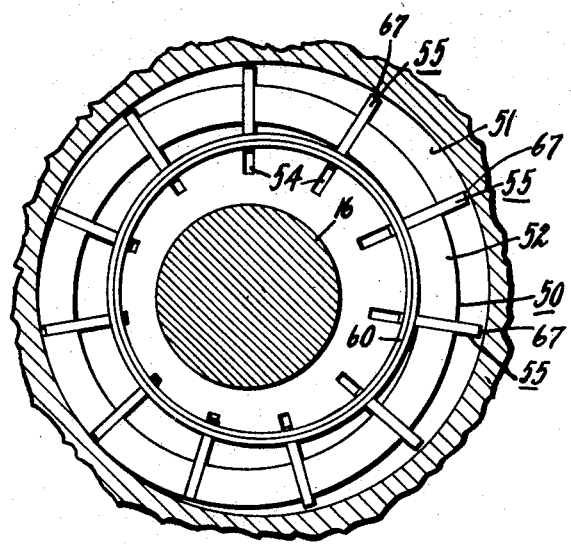
Figure 3 is a partial cross sectional view of a liquid circulating pump for the brake.

In this invention the energy transfer mechanism, or brake 100 comprises a housing 10 that has a cover plate 11 closing one end of an internal chamber 12. The cover plate 11 and housing 10 are supported upon the radial flange 13 of a support member 14 that is secured to the axle housing 15. The axle housing 15 extends from the differential (not shown) of a motor vehicle. Thus the brake illustrated in Fig. 1 is adapted for use with the rear wheel of a motor vehicle.

An axle 16 extends through the housing 10 and has a wheel flange 17 supporting studs 18 on which a vehicle wheel is adapted to be supported.

The cover plate 11 supports an anti-friction bearing 19 in which the axle 16 is journaled. The bearing 19 is retained in position in the cover plate 11 by means of a retainer plate 20 secured to the cover plate 11 by means of the bolts 21. A seal member 22 is provided between the inner and outer races of the anti-friction bearing 19 to prevent loss of fluid from the chamber 12 in the housing 10.

The axle 16 supports a disk carrier member 25 that is splined onto the axle 16 by means of the spline portion 26, and thus rotates with the axle. The disk carrier 25 is provided with spline teeth 27 on the annular portion 28 that supports a plurality of friction disks 29 for rotation with the carrier 25. The friction disks 29 have their opposite faces provided with friction lining elements 30 that are adapted to engage the metal disks 31 disposed between the rotatable disks 29. The disks 31 have their outer peripheral portions provided with slots that engage the studs 32 to prevent rotation of the disks 31 whereby they are stationary relative to the housing 10. The stud 32 also retains the cover plate onto the housing 10 and mounts the housing onto the flange 13 of the mounting member 14.

The brake disk assemblage, consisting of the rotatable disks 29 and the stationary disks 31 are normally held in spaced unengaged relationship by means of a plurality of compression springs 34 extending between the stationary plates 35 and 36 at the ends of the disk assemblage.

The disk assemblage 40 is adapted to be moved axially for brake engagement by means of an annular pressure plate 41 that has an annular axial extension 42 slidable within an annular axially disposed recess 43 provided in the housing 10. The recesses 43, at the inner end of the extension 42 provides a chamber 44 to receive hydraulic fluid under pressure from a master brake actuating cylinder 45 (see Fig. 2) adapted to be operated by the conventional brake pedal 46 provided on the motor vehicle. The pressure plate 41 is held in the normal disengaged position against the adjusting stops 47.

To provide for circulation of cooling liquid through the brake assemblage 40, a vane type pump 50 is provided within the housing 10. The pump 50 consists of a pumping chamber 51 formed in the housing 10. Within the pumping chamber 51 there is provided a carrier ring 52 keyed to the axle shaft 16 by means of a key member 53 to effect rotation of the carrier 52 with the axle shaft 16.

Figure 4:
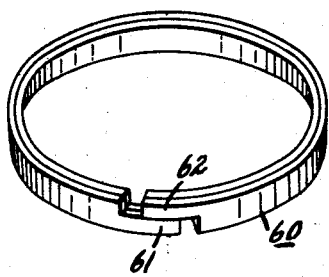
Figure 4 is a perspective elevational view of a thermal actuating element for the pump.

The carrier 52 has a plurality of slots 54 each of which carries a pumping element or vane 55 disposed radially of the axis of the chamber 51. The vanes 55 are maintained in proper working relation with respect to the periphery of the pumping chamber 51 by means of a pair of thermally responsive rings 60. The rings 60 are constructed of a bimetallic material so that the rings will expand upon a rise in temperature of their environmental surroundings and thus of the rings, and will contract upon a reduction in temperature of the rings and the environmental surroundings. The rings 60 are more specifically illustrated in Figure 4 wherein it will be noted that opposite ends 61 and 62 thereof are in overlapping relationship whereby the maximum degree of contraction of the ring 60 is controlled.

The rings 60 have their edge peripheries fitting within grooves 65 and 66 in each of the vanes 55 whereby contraction or expansion of the rings 60 will cause the vanes 55 to move radially inwardly or outwardly relative to the periphery of the pumping chamber 51. As shown in Figures 1 and 3, the vanes 55 are positioned radially inwardly relative to the periphery of the pumping chamber 51 so that the outer ends 67 of the vanes are out of engagement with the peripheral wall of the pumping chamber 51. This occurs when the temperature of the environment of the pump is below a predetermined minimum temperature. As the temperature of the pump environment rises, the rings 60 will expand radially until the ends 67 of the vanes 55 engage the periphery of the pump chamber 51.

So long as the ends of vanes 55 are disposed in spaced relationship to the periphery of the pumping chamber 51, the rotation of the vanes by the carrier ring 52 will effect substantially no liquid discharge from the pumping chamber, the pump in effect unloading itself with the liquid merely circulating internally of the pump. Any liquid that is discharged from the pump when the vanes are positioned radially inwardly as indicated in Figure 3 will be less than full volume flow from the pump so that the pump will be utilizing minimum horsepower from the axle 16 during such periods.

However, as the temperature of the environment of the pump increases, and the vanes 55 move radially outwardly to effect engagement of the ends 67 thereof with the pumping chamber, the volume of liquid discharged from the pump will be gradually increased until such time as the vanes engage the peripheral wall of the chamber 51 to effect full discharge capacity from the pump.

The pumping chamber 51 has a suction inlet chamber 70 that is connected with an inlet line 71. The pumping chamber 51 also is provided with a series of discharge openings 72 in the wall 73 that closes the recess in the housing 10 that forms the pumping chamber 51.

Liquid discharge from the pumping chamber is delivered into the chamber portion 12a of the chamber 12 from which the liquid then circulates between the brake disks 29 and 31 to the outer chamber 12b that has an outlet port or connection 72. The friction elements 30 of the brake disks 29 are each provided with a plurality of grooves in the face surfaces through which liquid can flow from the inner chamber 12a to the outer chamber 12b to pick up heat of friction when the disk assemblage is in braking engagement. Metal ring seals 75 are provided between the carrier 25 and cover member 11 and the pump wall 73 to prevent loss of cooling fluid from the chamber 12a.

Seal members 74 are provided between the axle shaft 16 and the housing 10 to prevent loss of fluid along the axle shaft.

The brake illustrated in Figure 1, as previously mentioned, is preferably a brake placed on the rear wheel of a motor vehicle. As illustrated in Figure 2, the brake 100 disclosed in Figure 1 is preferably associated with the rear wheels 80 of a motor vehicle. Each of these brakes contains a pump 50 heretofore described. The brakes 110 associated with the front wheels 90 do not necessarily have the pump unit 50.

Liquid coolant discharged from the rear wheel brakes 100 through the discharge outlets 72a communicate through the pipe lines 111 with a heat exchange device 112. A conduit 113 connects the heat exchange device 112 with a conduit 114 that conducts cooled fluid to the front wheel brakes 110. Fluid that is heated in the front wheel brakes 110 is conducted through the pipe lines 115 and 116 to a second heat exchange device 117 for cooling and return to the reservoir 118 by way of the pipe line 119. The reservoir 118 is connected by way of the pipe lines 120 and 121 with the suction inlet 71 for the circulating pump 50.

In operation, when the temperature of the brake 100 is below a predetermined temperature value, and thus the environmental conditions of the pump 50 is below the predetermined temperature value, the thermally active rings 60 will be contracted to prevent the pump 50 from full flow discharge into the brake housing 10 and thus during periods of low temperatures, the horsepower requirement for driving the pump 50 is removed from the axle 16. Such conditions occur after the motor vehicle has had a substantial period of idleness or on cold winter mornings, or during periods when the brakes are used to a very little extent.

However, at any time the environmental condition of the brake 100 reaches or rises above the predetermined minimum temperature value, the thermally active rings 60 will cause the vanes 55 to be moved from their first position of pumping inactivity to their second position of pumping activity in engagement with the periphery of the pumping chamber 51. Under this condition the pump is capable of delivering full volume flow from the pump so long as the temperature of the brake and the environment of the pump is above the predetermined minimum temperature. The temperature rise of the pump is of course reflected by the temperature of the coolant circulated by the pump so that as long as the temperature of the coolant remains below the predetermined minimum temperature, the pump will be rendered inactive by the contraction of the rings 60. However as the temperature of the coolant liquid rises, which is also a reflection of heat of friction from the brake assemblage 40, the pumping elements will be moved into their active pumping position by expansion of the rings 60 to cause full flow delivery from the pump and therefore rapid removal of heat of friction from the disk assemblage 40.

The master cylinder heretofore mentioned delivers fluid under pressure through the lines 120, 122, 123 and 124 to the front and rear wheel brakes of the vehicle.

Figure 5:
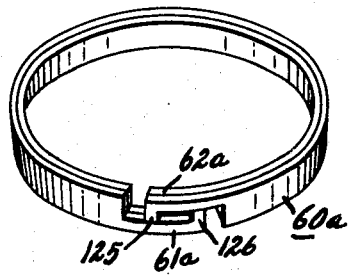
Figure 5 is a perspective elevational view of a modified form of thermal actuating unit for the pump.

In Figure 5 there is illustrated a modification of the thermally active rings 60 heretofore described. In this modification the ring 60a is constructed of a bimetallic material as heretofore mentioned, but the overlapping ends 61a and 62a of the ring are each provided with a hook portion 125 and 126 which limits the maximum degree of expansion of the ring 60a and therefore limits the degree of pressure that can be applied to the vane ends 67 when in engagement with the periphery of the pumping chamber 51. The overlapping ends 61a and 62a also control the maximum degree of contraction of the ring 60a in the same manner as heretofore described with reference to the ring of Figure 4.

While the form of embodiment of the invention as herein disclosed constitutes a preferred form, it is to be understood that other forms might be adopted as may come within the scope of the claims which follow.

What is claimed is as follows:

1. A liquid cooled multiple disk friction brake having a liquid coolant force circulated through the disk assemblage by pump means driven concurrently with a vehicle wheel carrying the brake, comprising, a stationary housing forming an enclosure, a wheel supporting axle extending through said housing, a multiple disk brake assemblage in a brake chamber in said housing having some of said disks connected with said axle for rotation therewith and other of said disks connected with said stationary housing, liquid circulating pump means within said housing and having pump elements in direct driven connection with said axle, said pump means including a pressure discharge passage in fluid communication with said brake chamber for delivery of liquid under pressure from said pump into said brake chamber, a heat exchange means having a fluid conducting conduit connection with said housing for liquid flow conduction from said housing to said heat exchange means and having a second fluid conducting conduit connection with said pump means for delivery of liquid from said heat exchange means to the inlet side of said pump means, and thermally actuated means within said pump means rendered active by temperature rise of the pump environment to actuate said pump elements to render said pump means active for forced liquid circulation when the temperature of the pump environment reaches a predetermined temperature value.

2. A liquid cooled multiple disk friction brake having a liquid coolant force circulated through the disk assemblage by pump means driven concurrently with a vehicle wheel carrying the brake, comprising, a stationary housing forming an enclosure, a wheel supporting axle extending through said housing, a multiple disk brake assemblage in a brake chamber in said housing having some of said disks connected with said axle for rotation therewith and other of said disks connected with said stationary housing, liquid circulating pump means within said housing and having pumping elements drivingly connected with said axle and having one position in which the pumping elements render the pump means ineffective for liquid circulation and a second position in which the pumping elements render the pump means effective for liquid circulation, said pump means including a pressure discharge passage in fluid communication with said brake chamber for delivery of liquid under pressure from said pump into said brake chamber, a heat exchange means having a fluid conducting conduit connection with said housing for liquid flow conduction from said housing to said heat exchange means and having a second fluid conducting conduit connection with said pump means for delivery of liquid from said heat exchange means to the inlet side of said pump means, and thermally actuated means in said pump means responsive to the temperature of the pump environment and connected with said pumping elements and actuated by a temperature rise of the pump environment to move said pumping elements from the said first position to the said second position as the temperature of the pump environment reaches a predetermined temperature value.

3. A liquid cooled multiple disk friction brake having a liquid coolant force circulated through the disk assemblage by pump means driven concurrently with a vehicle wheel carrying the brake, comprising, a stationary housing forming an enclosure, a wheel supporting axle extending through said housing, a multiple disk brake assemblage in a brake chamber in said housing having some of said disks connected with said axle for rotation therewith and other of said disks connected with said stationary housing, liquid circulating vane pump means within said housing having a plurality of radially disposed vanes forming pumping elements drivingly connected with said axle and rotatable within a pump chamber and movable radially from one position inwardly of the periphery of the pump chamber at which the vanes render the pump means ineffective for circulation of liquid to a second position in engagement with the periphery of the pump chamber in which the pump means is effective for circulation of liquid, said pump means having a pressure discharge passage in fluid communication with said brake chamber for delivery of liquid under pressure from said pump into said brake chamber, a heat exchange means having a fluid conduit means connected with said housing for liquid flow conduction from said housing to said heat exchange means and having a second fluid conducting conduit connection with said pump means for delivery of liquid from said heat exchange means to the inlet side of the said pump means, and thermally actuated means in said pump means responsive to the temperature of the pump environment and connected with said vanes and actuated by a temperature rise of the pump environment to move said vanes from the said first position to the said second position as the temperature of the pump environment reaches a predetermined temperature value.

4. A liquid cooled multiple disk friction brake having a liquid coolant force circulated through the disk assemblage by pump means driven concurrently with a vehicle wheel carrying the brake, comprising, a stationary housing forming an enclosure, a wheel supporting axle extending through said housing, a multiple disk brake assemblage in a brake chamber in said housing having some of said disks connected with said axle for rotation therewith and other of said disks connected with said stationary housing, liquid circulating pump means within said housing and having pump elements in direct driven connection with said axle for continuous operation therewith and having a pressure discharge passage in fluid communication with said brake chamber for delivery of liquid under pressure from said pump into said brake chamber, a heat exchange means having a fluid conducting conduit connection with said housing for liquid flow conduction from said housing to said heat exchange means and having a second fluid conducting conduit connection with said pump means for delivery of liquid from said heat exchange means to the inlet side of said pump means, and thermally actuated means within said pump means actuated by the temperature of the pump environment to actuate said pump elements to render said pump means active for full volume delivery from the pump means only when the temperature of the pump environment is above a predetermined temperature value.

5. A liquid cooled multiple disk friction brake having a liquid coolant force circulated through the disk assemblage by pump means driven concurrently with a vehicle wheel carrying the brake, comprising, a stationary housing forming an enclosure, a wheel supporting axle extending through said housing, a multiple disk brake assemblage in said housing having some of said disks connected with said axle for rotation therewith and other of said disks connected with said stationary housing, liquid circulating vane pump means within said housing having a plurality of radially disposed vanes drivingly connected with said axle for continuous rotation therewith within a pumping chamber and movable radially from one position out of engagement with the pumping chamber at which the pumping means is ineffective for circulation of liquid into a second position in engagement with the periphery of the pumping chamber at which the pumping means is effective for forced circulation of liquid, said pumping means having a pressure discharge connection with said housing for delivery of liquid under pressure into said housing, a heat exchange means having a fluid conducting conduit connection with said housing for liquid flow conduction from said housing to said heat exchange means and having a second fluid conducting conduit connection with said pumping means for delivery of liquid from said heat exchange means to the inlet side of said pump means, and thermally actuated means in said pump means connected with said vanes and actuated by the temperature of the pump environment to position said vanes radially inwardly relative to the periphery of said pumping chamber to render said pump means ineffective for full volume discharge from the pump means so long as the temperature of the pump environment is below a predetermined temperature value and actuated by a temperature rise of the pump environment above the said predetermined temperature value to move said vanes into engagement with the periphery of said pumping chamber to render said pump active for full volume discharge into said housing so long as the temperature of the pumping environment is above the said predetermined temperature value.

6. Apparatus in accordance with claim 5 in which the said thermally actuated means comprises thermally active ring means expansible by temperature increase of the said pump environment.

7. Apparatus in accordance with claim 5 in which the said thermally actuated means comprises thermally active ring means expansible by temperature increase of the said pump environment, said ring means having means limiting radial expansion of the ring means to the extent required to position said vanes in contact with the periphery of the pumping chamber.

References Cited in the file of this patent
UNITED STATES PATENTS

| | | |
|---|---|---|
| 1,174,678 | Carpenter et al. | Mar. 7, 1916 |
| 1,859,280 | Corbin | Feb. 26, 1929 |
| 2,195,130 | Hoyt | May 11, 1938 |
| 2,351,180 | Ash | Oct. 22, 1941 |
| 2,716,946 | Hardy | Sept. 6, 1955 |